C. J. LAWSON.
CONVEYER CHAIN.
APPLICATION FILED JUNE 20, 1921.
1,414,424.
Patented May 2, 1922.
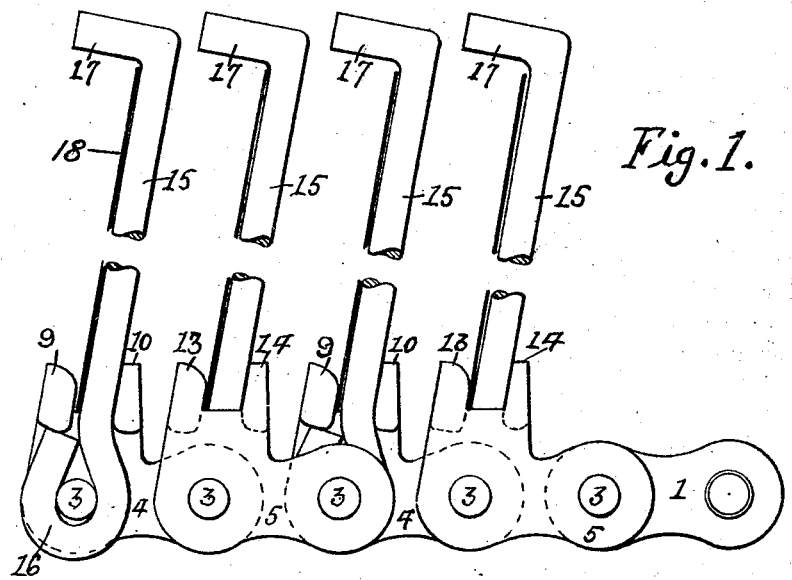
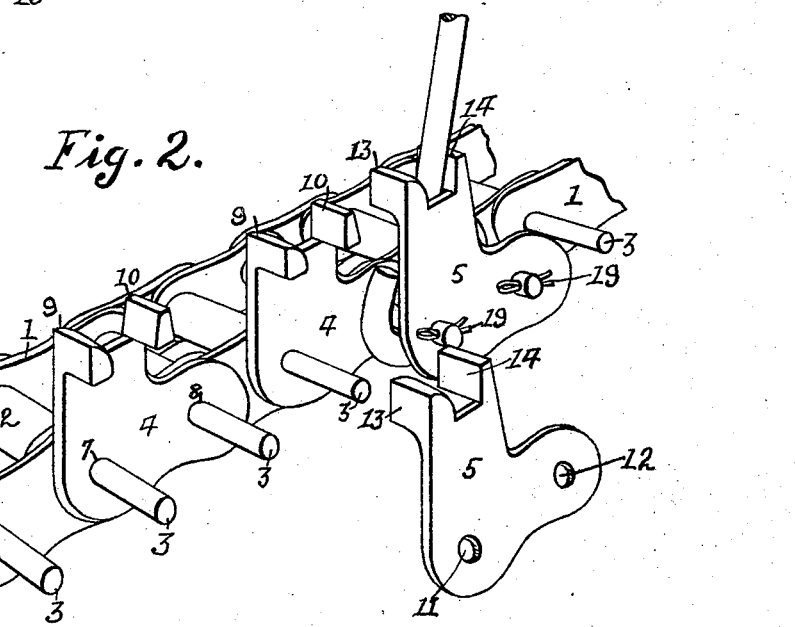
Clarence J. Lawson
Inventor:
by Robert B. Killgore
Atty

UNITED STATES PATENT OFFICE.

CLARENCE J. LAWSON, OF YONKERS, NEW YORK.

CONVEYER CHAIN.

1,414,424. Specification of Letters Patent. Patented May 2, 1922.

Application filed June 20, 1921. Serial No. 478,941.

*To all whom it may concern:*

Be it known that I, CLARENCE J. LAWSON, a citizen of the United States, residing at Yonkers, in the county of Westchester and State of New York, have invented certain new and useful Improvements in Conveyer Chains, of which the following is a specification.

My invention relates to conveyer chains for use in rotary driers such as is shown in U. S. Letters Patent No. 1,150,302, dated August 17, 1915, and it is my object to so construct the side links of the chain and the hooks that the freshly laquered plates will be firmly supported not only on the straight line travel, but also in making the turn around the sprocket wheels at the ends of the drier, thereby avoiding falling out, sliding and scratching of the plates.

The drawing shows a portion of one of my improved chains and Fig. 1 is a side view thereof with the hooks thereon and Fig. 2 a perspective view of the structure of Fig. 1 with one outside link in position with a hook thereon and one outside link detached from the chain to disclose the construction of the inner links.

As shown in Patent No. 1,150,302 the conveyer chains are endless and used in pairs, running over sprockets at the ends of the oven or drier. Wire hooks are mounted on the chains and serve to guide and support the lacquered plates and space them one from another during their passage through the drier, and especially while making the turn over the sprockets.

The improved chain, forming the subject matter of this application, consists of the usual sprocket links 1 with the rollers 2 fitting between the sprocket teeth. The pins 3 are extended outwardly on one side as shown in Fig. 2 and carry the inner plates 4 and outer plates 5.

The inner plates 4 consist of a flat body, perforated at 7 and 8 to fit the chain pins 3 and have the extensions or clips 9 and 10 at the upper ends.

The outer plates 5 have corresponding apertures 11 and 12 and a like pair of extensions or clips 13 and 14 at their upper ends, which, however, project in a direction opposite to the clips 9 and 10 on the inner links or plates.

The wire hooks 15 each have an eye 16 at one end to fit the pins 3 and a bend 17 at the other or free end to catch the edge of a plate 18.

In use the chains are placed over the sprockets in the drier with the plate sides opposed.

In making up the chains the inner plates 4 are slipped on the pins 3 with the clips 9 and 10 facing out, the eyes 16 of the hooks 15 are then slipped on the pins 3 with the body of alternate hooks between the clips 9 and 10. The outer plates 5 are then slipped on the pins 3 with the clips 13 and 14 facing in, with the other alternate set of wire hooks between the clips 13 and 14, after which the whole is secured to the pins 3, cotter pins 19 being shown.

By this construction the clips 9 and 10 on the plates 4 and the clips 13 and 14 on the plates 5 are in line, as are also the hooks 15.

The clips 9 and 10 and 13 and 14 are spaced so that the hooks 15 have a movement of about ten degrees on either side of the vertical line.

It is apparent that the side links on one side of the sprocket chain may be omitted and the plates and hooks slipped on the chain pins forming the links on one side of the chain.

In use the freshly lacquered plates 18 are fed into one end of the drier and laid on a pair or hooks when they come into a substantially horizontal position. As the hooks approach the vertical position the plates 18 slide down into the space between the hooks 15 and the clips 9 and 13, which are rounded to allow them to easily slip into position. The other clips 10 and 14 serve as stops to prevent the hooks falling more than 10° behind the vertical.

When the other end of the oven is reached and the plates are to be carried around and complete the return journey on the hooks, in the bottom of the oven, the hooks 15 will fall 10° forward with respect to the vertical at the beginning of the turn and, due to their weight and leverage, will grip the corners of the plates 17 between them and the clips 9 and 13 so that the plates will swing free, held at two points at the corners, while the hooks and plates are making the turn. As soon as the hooks have reached approximately the vertical position in the bottom of the oven the pressure on the plates against the clips 9 and 14 is released and the plates slip down and rest on the bent ends of the hooks for the return journey through the oven from which they are removed at the end at which they entered.

In some cases it may be desirable to employ feeding devices at each end of the oven and remove the plates at the end opposite that which it entered in which event clips and hooks firmly hold the plates until they have assumed a vertical position.

I claim:—

1. A conveyer chain for drying ovens comprising a chain, side plates thereon provided with spaced clips extending beyond the chain, hooks swingingly secured to the chain and free to swing toward and away from said clips.

2. A conveyer chain for drying ovens comprising a chain, side plates thereon provided with spaced clips extending beyond the chain, the clips of alternate plates extending in opposite directions, hooks swingingly secured to the chain and free to swing toward and away from said clips.

In testimony whereof I have affixed my signature.

CLARENCE J. LAWSON.